US009547527B2

(12) United States Patent
Schneider (10) Patent No.: US 9,547,527 B2
(45) Date of Patent: Jan. 17, 2017

(54) SCHEDULING NETWORK DISTRIBUTED JOBS BASED ON OBSERVING AN ALLOCATED MEMORY SIZE AND OPEN FILES OF A RUNNING COMPUTATION JOB

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1911 days.

(21) Appl. No.: 12/074,047

(22) Filed: Feb. 28, 2008

(65) Prior Publication Data

US 2009/0222831 A1    Sep. 3, 2009

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/5038* (2013.01); *G06F 2209/483* (2013.01)

(58) Field of Classification Search
CPC ............ G06F 2209/5021; G06F 9/50–9/5055; G06F 9/00–9/548
See application file for complete search history.

(56) References Cited

U.S. PATENT DOCUMENTS

| 6,065,036 | A * | 5/2000 | Hisatake | 718/100 |
| 6,223,205 | B1 * | 4/2001 | Harchol-Balter et al. | 718/105 |
| 7,370,328 | B2 * | 5/2008 | Yamada et al. | 718/105 |
| 2002/0002578 | A1 * | 1/2002 | Yamashita | 709/105 |
| 2002/0087623 | A1 * | 7/2002 | Eatough | 709/203 |
| 2011/0247003 | A1 * | 10/2011 | Fong et al. | 718/104 |

\* cited by examiner

*Primary Examiner* — Keith Vicary
(74) *Attorney, Agent, or Firm* — Lowenstein Sandler LLP (57) ABSTRACT

A method and apparatus for scheduling processing jobs is described. In one embodiment, a scheduler receives a request to process one or more computation jobs. The scheduler generates a size metric corresponding to a size of an executable image of each computation job and a corresponding data set associated with each computation job. The scheduler adjusts a priority of each computation job based on a system configuration setting and schedules the process of each computation job according to the priority of each computation job. In another embodiment, the scheduler distributes the plurality of computation jobs on one or more processors of a computing system, where the system configuration setting prioritizes a computation job with a smaller size metric than a computation job with a larger size metric. In another embodiment, the scheduler distributes the computation jobs across a network of computing systems with one or more computation jobs distributed over one or more computing systems, where the system configuration setting prioritizes a computation job with a smaller size metric than a computation job with a larger size metric.

20 Claims, 7 Drawing Sheets

SCHEDULING NETWORK DISTRIBUTED JOBS BASED ON OBSERVING AN ALLOCATED MEMORY SIZE AND OPEN FILES OF A RUNNING COMPUTATION JOB

TECHNICAL FIELD

Embodiments of the present invention relate to computing systems, and more particularly, to scheduling computation jobs.

BACKGROUND

A job (or a process) commonly refers to a single instance of a program in computing systems. The software responsible for managing this is known as a job scheduler. Because such computing systems tend to have many jobs active at any one time, the scheduler provides a management setting that allow the user to stop/pause/restart jobs, and to set priorities on jobs (so that job A might get more 'timeslices' per cycle than other jobs).

The scheduling algorithm of a scheduler is the method by which processes are given access to system resources, usually processor time. This is usually done to load balance a system effectively. The algorithm used may be as simple as round-robin in which each process is given equal time (for instance 1 ms, usually between 1 ms and 100 ms) in a cycling list. So, process A executes for 1 ms, then process B, then process C, then back to process A. More advanced algorithms take into account process priority, the importance of the process, or the prior resource utilization of a job. This allows some processes to use more time than other processes. For example, a job that used a lot of processing time in the recent past may likely need a lot of processing time again in the near future.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for scheduling processing jobs is described. In one embodiment, a scheduler receives a request to process one or more computation jobs. The scheduler generates a size metric corresponding to a size of an executable image of each computation job and a corresponding data set associated with each computation job. The scheduler adjusts a priority of each computation job based on a system configuration setting and schedules the process of each computation job according to the priority of each computation job. In another embodiment, the scheduler distributes the plurality of computation jobs on one or more processors of a computing system, where the system configuration setting prioritizes a computation job with a smaller size metric higher than a computation job with a larger size metric. In another embodiment, the scheduler distributes the computation jobs across a network of computing systems with one or more computation jobs distributed over one or more computing systems, where the system configuration setting prioritizes a computation job with a smaller size metric higher than a computation job with a larger size metric.

Figure 1:
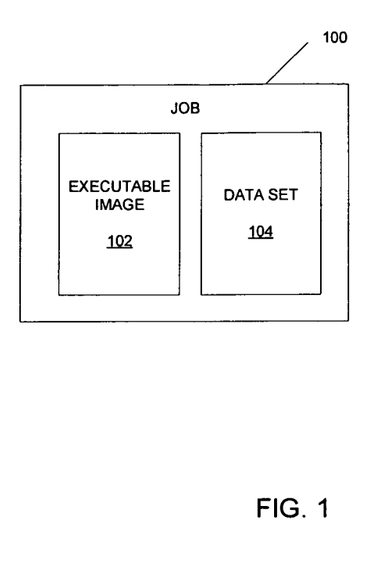
FIG. 1 is a block diagram illustrating exemplary components of a computation job.

FIG. 1 is a block diagram illustrating exemplary components of a computation job used for measurements. Scheduling heuristics are sensitive to the probable running time of a particular processing job. For most programs, the total amount of memory used for its loaded image and all of its data is a reasonable proxy for a length-of-runtime ranking. For example, a program that loads into 25 MB of RAM and has data sets totaling a gigabyte or two is likely to take longer to run than one that only takes a couple hundred KB of RAM, and about a megabyte of data files. In one embodiment, the scheduler can measure the size of a job 100 by measuring the executable image 102 and the data set 104 corresponding to the executable image 102. In another embodiment, the scheduler could rely on the job submission process to provide a size metric.

Figure 2:
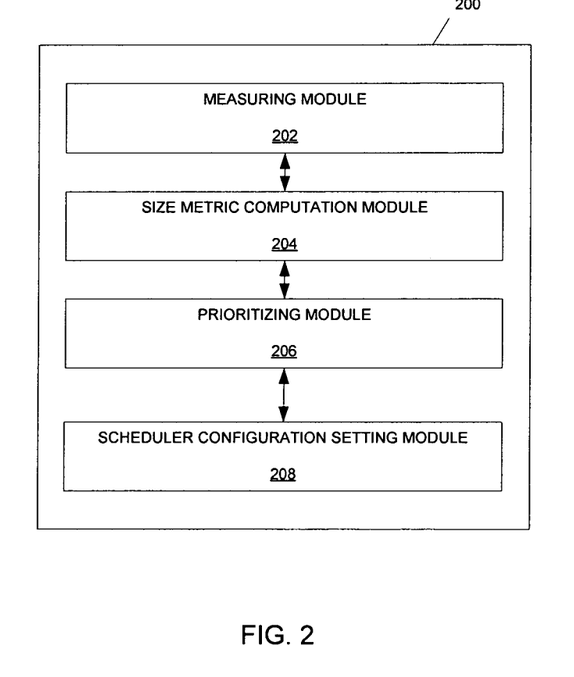
FIG. 2 is a block diagram illustrating one embodiment of a scheduler.

FIG. 2 is a block diagram illustrating one embodiment of a scheduler 200. In one embodiment, scheduler 200 includes a measuring module 202, a size metric computation module 204, an prioritizing module 206, and a scheduler configuration setting module 208. Measuring module 202 measures a size of an executable image and a corresponding data set associated with the executable image of a computation job. Size metric computation module 204, coupled to measuring module 202, computes a computation job size based on the measurement of the size of the executable image and the corresponding data set. In one embodiment, if the scheduler is part of a node's OS, it could just look at a running process' allocated memory size and open files to determine the process size metric.

Prioritizing module 206, coupled to size metric computation module 204, prioritizes the computation job based on the computation job size. Scheduler configuration setting module 208, coupled to the prioritizing module, stores a user-defined priority setting for the jobs. In one embodiment, smaller jobs are prioritized over the larger ones. In another embodiment, in a clustered or networked job environment, where a single job may be spread across multiple nodes, it is more likely that a large job could be distributed over all of the nodes than it is that the small job could be. So if the small job has priority, it is more likely that both the small job and the large job will be running at the same time.

Figure 3:
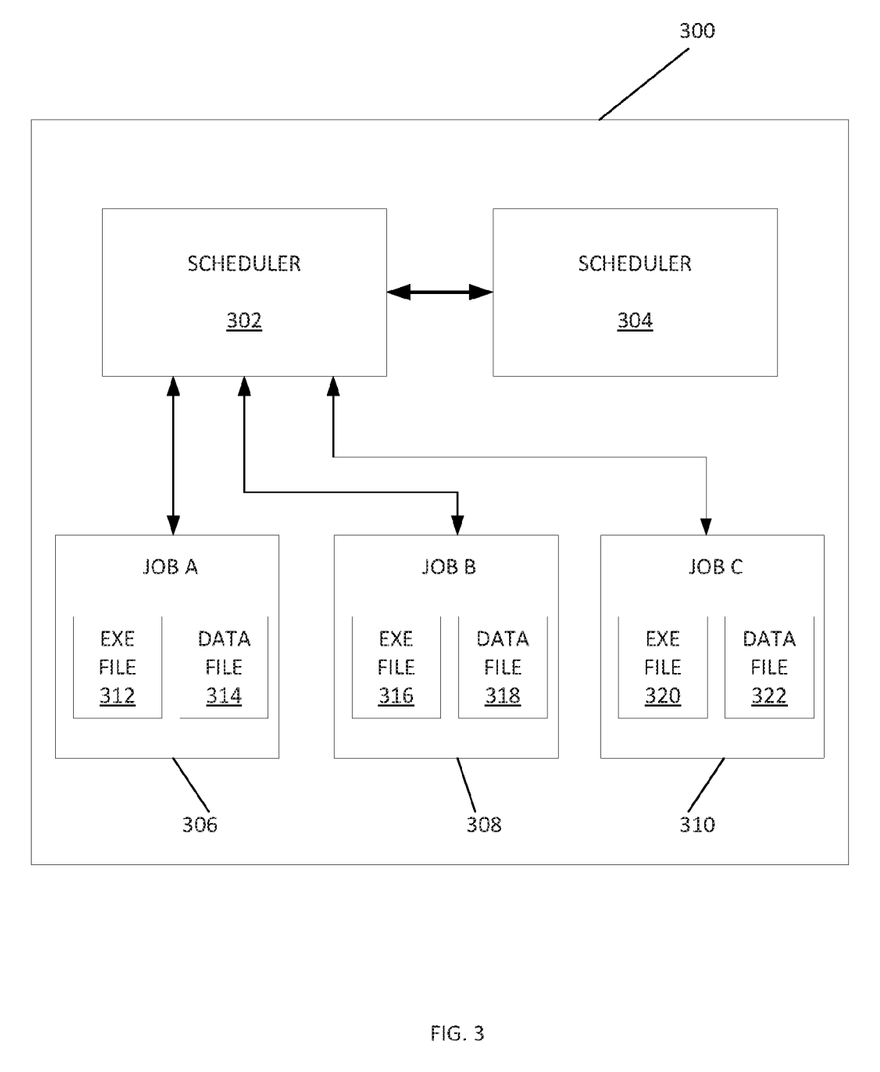
FIG. 3 is a block diagram illustrating one embodiment of a computing system.

FIG. 3 is a block diagram illustrating one embodiment of a computing system 300. The computing system 300 may include a scheduler 302, a processor 304, and jobs 306, 308, 310. Each job 306,308,310 is represented by its respective executable image 312, 316, 320 and data set 314, 318, 322. In one embodiment, scheduler 302 receives a request from processor 304 to process computation jobs 306,308, and 310. Scheduler 302 generates a size metric corresponding to a size of an executable image 312, 316, 320 of each computation job 306, 308, 310 and a corresponding data set 314, 318, 322 associated with each computation job 306, 308,310. Scheduler 302 adjusts a priority of each computation job 306,308,310 based on a system configuration setting. In one embodiment, the system configuration setting prioritizes a computation job with a smaller size metric higher than a computation job with a larger size metric. Scheduler 302 then schedules each job 306, 308, 310 to be processed by processor 304 according to its priority. In another embodiment, scheduler 302 schedules the jobs to more than one processor in the computing system 300.

Furthermore, in another embodiment, scheduler 302 stores a history of prior resource utilization of each computation job, and adjusts the priority of each computation job based on the history of prior resource utilization of the corresponding computation job.

Figure 4:
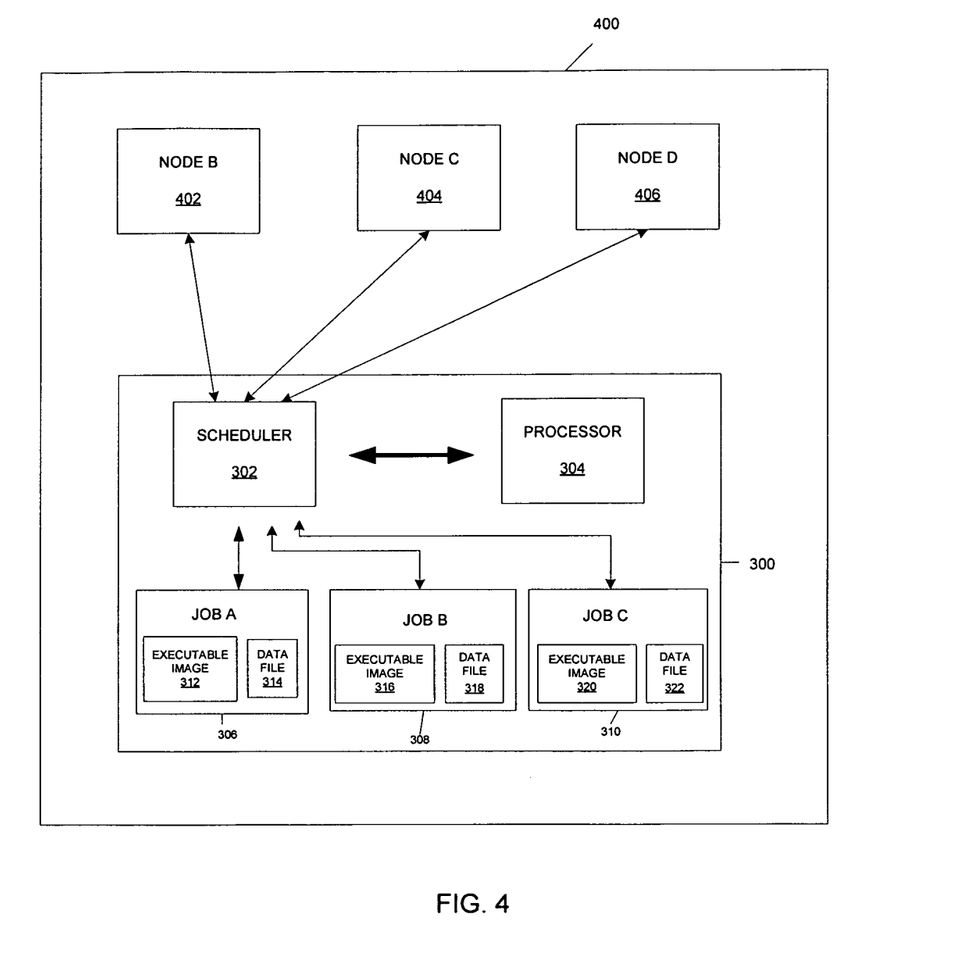
FIG. 4 is a block diagram illustrating one embodiment of a network of computing systems.

FIG. 4 is a block diagram illustrating one embodiment of a network of computing systems. The computing system 400 may include a network of computing nodes 300, 402, 404, 406. In one embodiment, scheduler 302 receives a request from processor 304 to process computation jobs 306,308, and 310. Scheduler 302 generates a size metric corresponding to a size of an executable image 312, 316, 320 of each computation job 306, 308, 310 and a corresponding data set 314, 318, 322 associated with each computation job 306, 308,310. Scheduler 302 adjusts a priority of each computation job 306,308,310 based on a system configuration setting. In one embodiment, the system configuration setting prioritizes a computation job with a smaller size metric higher than a computation job with a larger size metric. Scheduler then 302 schedules each job 306, 308, 310 to be processed according to its priority. In one embodiment, scheduler 302 distributes the processing of computation jobs 306, 308, and 310 across the network of computing systems or nodes 402, 404, 406. One or more computation jobs can be distributed over one or more computing systems or nodes. In one embodiment, the system configuration setting of scheduler 302 prioritizes a computation job with a smaller size metric than a computation job with a larger size metric.

Figure 5:
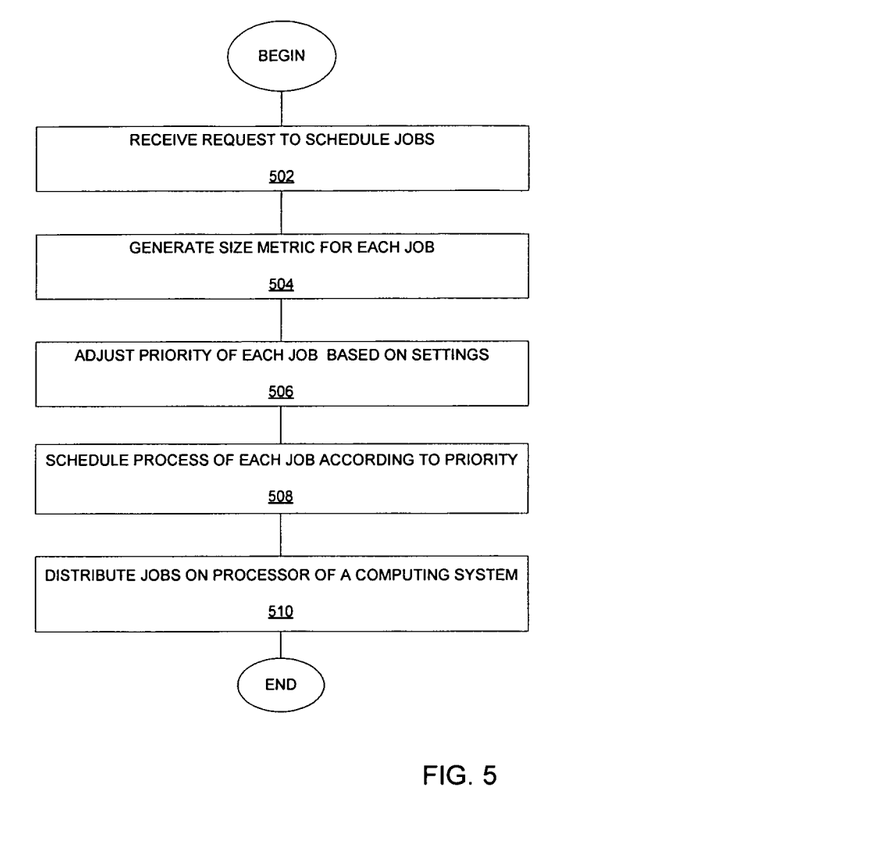
FIG. 5 is a flow diagram of one embodiment of a method for scheduling computation jobs.

FIG. 5 is a flow diagram of one embodiment of a method for scheduling computation jobs. At 502, a scheduler of a computing system receives a request to schedule the processing of one or more computation jobs or processes. At 504, the scheduler generates a size metric corresponding to a size of an executable image of each computation job and a corresponding data set associated with each computation job. In one embodiment, scheduler measures a size of the executable image of each computation job and a size of the corresponding data set associated with each computation job. At 506, the scheduler adjusts a priority of each computation job based on a system configuration setting. At 508, the scheduler schedules the process of each computation job according to the priority of each computation job. In another embodiment, scheduler stores a history of prior resource utilization of each computation job, and further adjusts the priority of each computation based on the history of prior resource utilization of the corresponding computation job. At 510, the scheduler distributes the computation jobs on one or more processors of a computing system, where a system configuration setting of the scheduler prioritizes a computation job with a smaller size metric than a computation job with a larger size metric.

Figure 6:
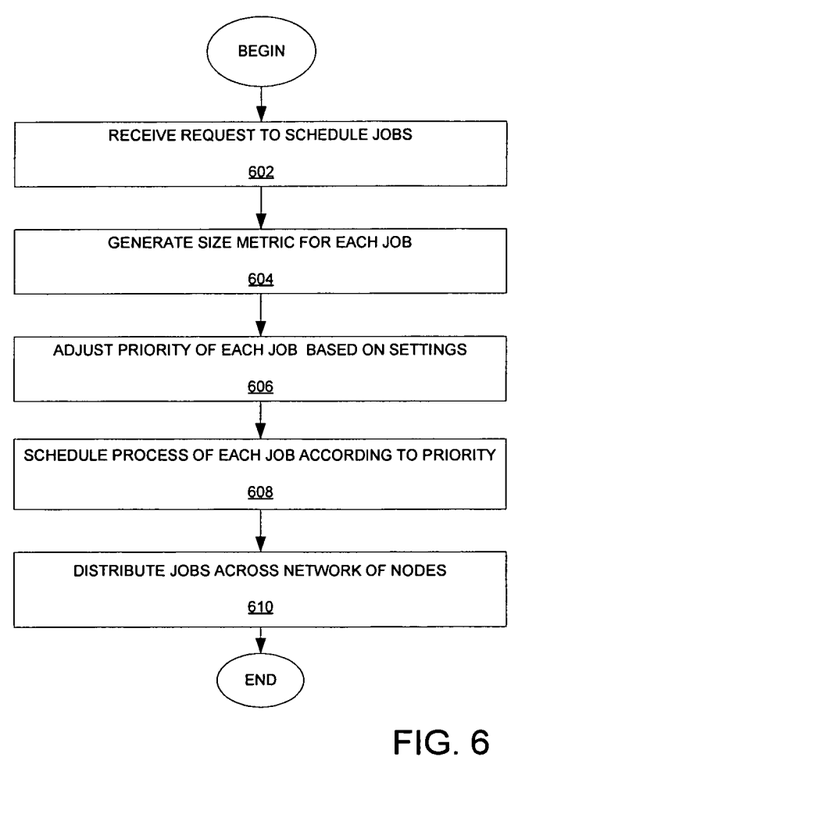
FIG. 6 is a flow diagram of another embodiment of a method for scheduling computation jobs across a network of computing systems.

FIG. 6 is a flow diagram of another embodiment of a method for scheduling computation jobs across a network of computing systems. At 602, a scheduler of a computing system receives a request to schedule the processing of one or more computation jobs or processes. At 604, the scheduler generates a size metric corresponding to a size of an executable image of each computation job and a corresponding data set associated with each computation job. In one embodiment, scheduler measures a size of the executable image of each computation job and a size of the corresponding data set associated with each computation job. At 606, the scheduler adjusts a priority of each computation job based on a size metric and on a system configuration setting. At 608, the scheduler schedules the process of each computation job according to the priority of each computation job. In another embodiment, scheduler stores a history of prior resource utilization of each computation job, and further adjusts the priority of each computation based on the history of prior resource utilization of the corresponding computation job. At 610, the scheduler distributes the computation jobs across a network of computing systems, where a system configuration setting of the scheduler prioritizes a computation job with a smaller size metric than a computation job with a larger size metric.

Figure 7:
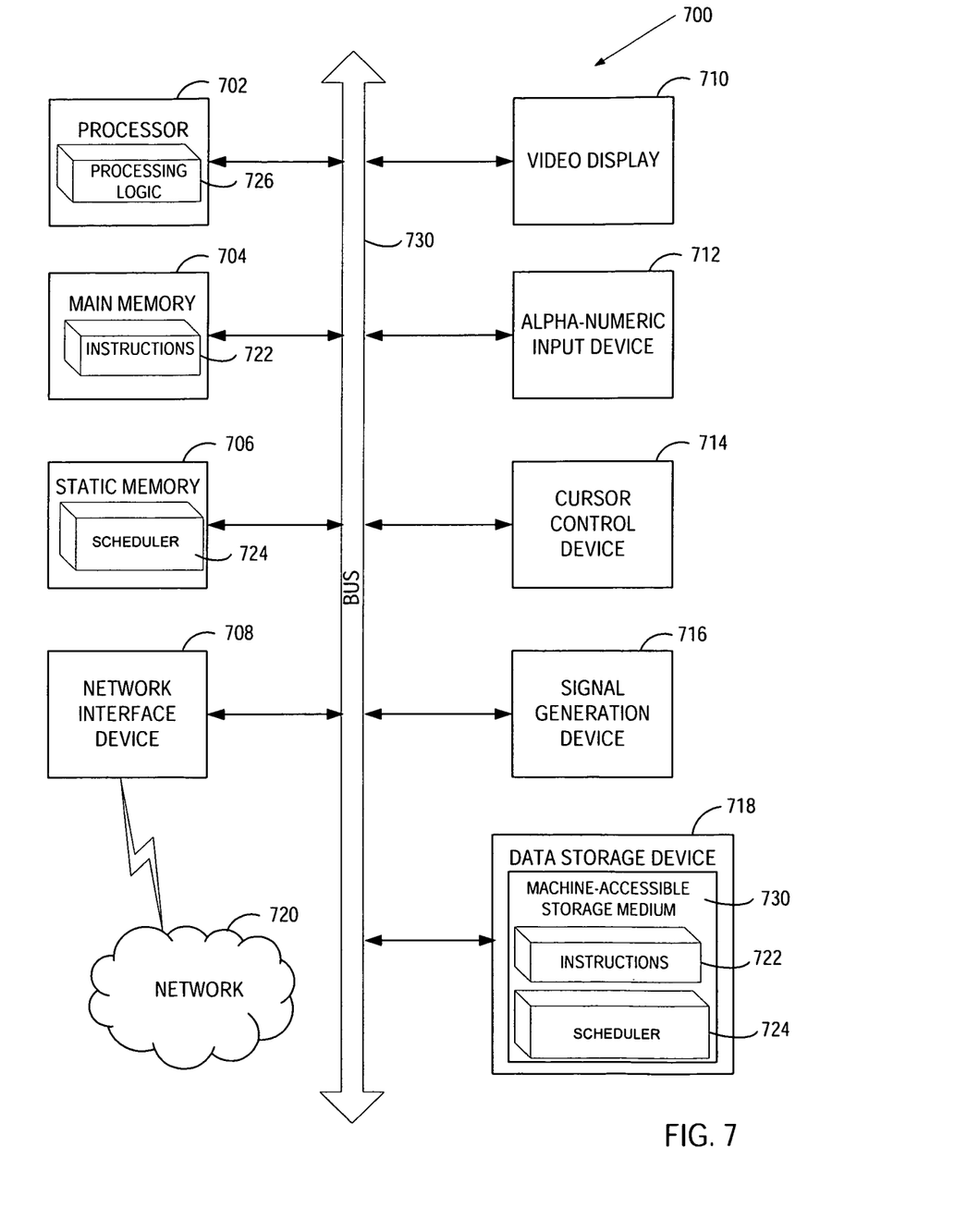
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store a scheduler 724 as presently described. The scheduler 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a request to process a plurality of computation jobs, wherein each of the plurality of computation jobs is associated with a respective executable image and a respective data set corresponding to the respective executable image;
    determining a respective first size of the respective executable image of a computation job and a respective second size of the respective data set corresponding to the respective executable image, wherein the determining of the respective first size and the respective second size comprises observing an allocated memory size of the computation job and open files of the respective data set while the computation job is running;
    generating, by a processing device, a respective size metric as a function of the respective first size of the respective executable image and the respective second size of the respective data set associated with respective each of the plurality of computation jobs;
    adjusting a respective priority of the respective each of the plurality of computation jobs in view of the respective size metric and a system configuration setting; and
    scheduling an order to process the plurality of computation jobs according to the adjusted respective priority of the respective each of the plurality of computation jobs.

2. The method of claim 1 further comprising:
    distributing the plurality of computation jobs on one or more processing devices of a computing system, wherein the system configuration setting prioritizes a computation job with a smaller size metric higher than a computation job with a larger size metric.

3. The method of claim 1 further comprising:
    distributing the plurality of computation jobs across a network of computing systems, one or more computation jobs distributed over one or more computing systems, wherein the system configuration setting prioritizes a computation job with a smaller size metric higher than a computation job with a larger size metric.

4. The method of claim 1 wherein generating the respective size metric further comprises measuring the respective first size of the respective executable image, and measuring the respective second size of the respective data set associated with the respective each of the plurality of computation jobs, wherein the system configuration setting comprises a user-defined priority setting for the plurality of computation jobs.

5. The method of claim 1 further comprising:
distributing a computation job with a larger size metric across multiple nodes in a clustered or networked job environment; and
simultaneously running the computation job with a larger size metric and a computation job with a smaller size metric in the clustered or networked job environment.

6. A non-transitory machine-accessible storage medium including data that, when accessed by a processing device, cause the processing device to:
receive a request to process a plurality of computation jobs, wherein each of the plurality of computation jobs is associated with a respective executable image and a respective data set corresponding to the respective executable image;
determine a respective first size of the respective executable image of a computation job and a respective second size of the respective data set corresponding to the respective executable image, wherein the determining of the respective first size and the respective second size comprises observing an allocated memory size of the computation job and open files of the respective data set while the computation job is running;
generate, by the processing device, a respective size metric as a function of the respective first size of the respective executable image and the respective second size of the respective data set associated with respective each of the plurality of computation jobs;
adjust a respective priority of the respective each of the plurality of computation jobs in view of the respective size metric and a system configuration setting; and
schedule an order to process the plurality of computation jobs according to the adjusted respective priority of the respective each of the plurality of computation jobs.

7. The non-transitory machine-accessible storage medium of claim 6 wherein the processing device is to:
distribute the plurality of computation jobs on one or more processing devices of a computing system, wherein the system configuration setting prioritizes a computation job with a smaller size metric higher than a computation job with a larger size metric.

8. The non-transitory machine-accessible storage medium of claim 6 wherein the processing device is to:
distribute the plurality of computation jobs across a network of computing systems, one or more computation jobs distributed over one or more computing systems, wherein the system configuration setting prioritizes a computation job with a smaller size metric higher than a computation job with a larger size metric.

9. The non-transitory machine-accessible storage medium of claim 6, wherein the processing device is to:
measure the respective first size of the respective executable image of the respective each of the plurality of computation jobs; and
measure the respective second size of the respective data set associated with the respective each of the plurality of computation jobs, wherein the system configuration setting comprises a user-defined priority setting for the plurality of computation jobs.

10. The non-transitory machine-accessible storage medium of claim 6, wherein the processing device is to:
distribute a computation job with a larger size metric across multiple nodes in a clustered or networked job environment; and
simultaneously run the computation job with a larger size metric and a computation job with a smaller size metric in the clustered or networked job environment.

11. An apparatus comprising:
a processing device to:
receive a request to process a plurality of computation jobs, wherein each of the plurality of computation jobs is associated with a respective executable image and a respective data set corresponding to the respective executable image;
measure a respective first size of the respective executable image of a computation job and a respective second size of the respective data set corresponding to the respective executable image, wherein measuring the respective first size and the respective second size comprises observing an allocated memory size of the computation job and open files of the respective data set while the computation job is running;
compute a respective size metric as a function of the respective first size of the respective executable image and the respective second size of the respective data set associated with respective each of the plurality of computation jobs;
adjust a respective priority of the respective each of the plurality of computation jobs in view of the respective size metric and a system configuration setting; and
schedule an order to process the plurality of computation jobs according to the adjusted respective priority of the respective each of the plurality of computation jobs.

12. The apparatus of claim 11, wherein the processing device is further to:
distribute the plurality of computation jobs on one or more processing devices of a computing system, wherein the system configuration setting prioritizes a computation job with a smaller size metric higher than a computation job with a larger size metric.

13. The apparatus of claim 11, wherein the processing device is further to:
distribute the plurality of computation jobs across a network of computing systems, one or more computation jobs distributed over one or more computing systems, wherein the system configuration setting prioritizes a computation job with a smaller size metric higher than a computation job with a larger size metric.

14. The apparatus of claim 11, wherein the processing device is further to:
distribute a computation job with a larger size metric across multiple nodes in a clustered or networked job environment; and
simultaneously run the computation job with a larger size metric and a computation job with a smaller size metric in the clustered or networked job environment.

15. A computing system comprising:
a memory to store instructions;

a processing device, operatively coupled to the memory, to execute the instructions to:
  generate a respective size metric as a function of a respective first size of a respective executable image associated with respective each of a plurality of computation jobs and a respective second size of a respective data set corresponding to the respective executable image, wherein generating the respective size metric comprises observing an allocated memory size of a computation job of the plurality of computation jobs and open files of the respective data set while the computation job is running;
  adjust a respective priority of the respective each of the plurality of computation jobs in view of the respective size metric and a system configuration setting; and
  schedule an order to process the plurality of computation jobs according to the adjusted respective priority of the respective each of the plurality of computation jobs and to process the respective each of the plurality of computation jobs according to the order.

16. The computing system of claim 15, wherein the processing device is further to execute the instructions to:
  measure the respective first size of the respective executable image associated with the respective each of the plurality of computation jobs; and
  measure the respective second size of the respective data set associated with the respective each of the plurality of computation jobs, wherein the system configuration setting prioritizes a computation job with a smaller size metric higher than a computation job with a larger size metric.

17. The computing system of claim 16, wherein the processing device is further to execute the instructions to:
  distribute a computation job with a larger size metric across multiple nodes in a clustered or networked job environment; and
  simultaneously run the computation job with a larger size metric and a computation job with a smaller size metric in the clustered or networked job environment.

18. A computing system comprising:
  a processing device, operatively coupled to a network of a plurality of nodes, the processing device to:
    generate a respective size metric as a function of a respective first size of a respective executable image associated with respective each of a plurality of computation jobs and a respective second size of a respective data set corresponding to the respective executable image, wherein generating the respective size metric comprises observing an allocated memory size of a computation job of the plurality of computation jobs and open files of the respective data set while the computation job is running;
    adjust a respective priority of the respective each of the plurality of computation jobs in view of the respective size metric and a system configuration setting;
    schedule an order to process the plurality of computation jobs according to the adjusted respective priority of the respective each of the plurality of computation jobs; and
    distribute the plurality of computation jobs across the network of the plurality of nodes according to the order.

19. The computing system of claim 18, wherein the processing device is further to:
  measure the respective first size of the respective executable image associated with the respective each of the plurality of computation jobs; and
  measure the respective second size of the respective data set associated with the respective each of the plurality of computation jobs, wherein the system configuration setting prioritizes a computation job with a smaller size metric higher than a computation job with a larger size metric, and wherein each node in the plurality of nodes comprises a respective processor.

20. The computing system of claim 19, wherein the processing device is further to:
  distribute a computation job with a larger size metric across multiple nodes in a clustered or networked job environment; and
  simultaneously run the computation job with a larger size metric and a computation job with a smaller size metric in the clustered or networked job environment.

* * * * *